US005339507A

United States Patent [19]

Cox

[11] Patent Number: 5,339,507

[45] Date of Patent: Aug. 23, 1994

[54] WINDOW REMOVAL SYSTEM

[76] Inventor: Rick L. Cox, 919 Casa Nova, Monterey, Calif. 93940

[21] Appl. No.: 792,498

[22] Filed: Nov. 13, 1991

[51] Int. Cl.[5] .......................... B23P 19/04; B25B 25/00

[52] U.S. Cl. .................................. 29/267; 29/897.312; 29/426.4; 29/283; 29/283.5; 254/218; 254/223; 52/749

[58] Field of Search ............... 254/214, 216, 217, 218, 254/223, 199, 208, 212; 81/367, 368, DIG. 1; 29/897.312, 426.4, 244, 283, 267, 283.5; 52/127.1, 749

[56] References Cited

U.S. PATENT DOCUMENTS 547,716 10/1895 Day .................................... 254/218
1,521,209 12/1924 Warner ........................... 254/218 X
2,424,037 7/1947 Jenkins ................................ 29/283
2,966,818 1/1961 Froeschl .............................. 81/368
3,234,497 2/1966 Condry ................................ 81/367
4,199,134 4/1980 Kerber et al. .................. 254/218 X
4,742,992 5/1988 Allen .................................. 254/199

FOREIGN PATENT DOCUMENTS 56-89683 7/1981 Japan .
56-124136 9/1981 Japan .

*Primary Examiner*—Daniel P. Stodola
*Assistant Examiner*—Michael R. Mansen
*Attorney, Agent, or Firm*—LaRiviere & Grubman

[57] ABSTRACT

Apparatus for removing metal framed windows and doors applies inwardly-directed force to collapse the frame inwardly upon itself. A tool consisting of clamps and a tensioning device which applies the force sequentially around the frame. At each position where the tool is fastened to the frame, tension is applied to the frame until one or more sides collapse inwardly. The tool is then repositioned and the process repeated until the entire frame is collapsed and can be removed.

2 Claims, 4 Drawing Sheets

WINDOW REMOVAL SYSTEM

TECHNICAL FIELD

The present invention relates generally to systems for removing components of buildings for replacement with similar components. More specifically, the present invention relates to removal of metal framed windows and door frames for their replacement.

BACKGROUND ART

Buildings constructed since the early 1940s and continuing to the present, especially single family houses and multifamily buildings, are frequently constructed with metal framed windows and doors securely mounted to a wooden supporting structure. The metal-to-wood joint is usually sealed with stucco on the exterior surface and joint compound/plaster or other trim material in the interior surface.

These windows were typically glazed with single pane glass which is considered unacceptable under present standards for energy efficiency. As styles for building design evolved over time, these metal framed windows have become unacceptable for aesthetic reasons as well.

In the current economic market it is often desirable to remodel existing buildings and homes as a cost effective alternative to building or buying new homes. One of the most popular remodeling goals is to replace the old style, energy inefficient windows with current style, energy efficient multipane windows. The removal of the old windows however, normally requires major defacement of the building exterior which, in turn, requires major restoration after replacement with new windows.

In the past practice of building construction, windows, and doors as well, were relatively permanently attached to the building's structure with nails or screws. No provision was made for replacement of these components with newer components. Especially in stucco and masonry exterior construction, the fasteners were normally covered by the exterior finish.

The normal practice for replacing these components is to break or cut away the covering material, remove the component by prying and breaking it out, replace the removed component with a new component, and then patch the exterior and interior surfaces. Patching old surfaces such as weathered stucco and brick is rarely done without leaving highly undesirable visible changes in texture or color.

In addition to the aesthetic shortcomings of the current practice, the time required to accomplish the removal and restoration is normally hours at best, sometimes days. The work usually requires several craftsmen, typically a carpenter for the removal and replacement and a plasterer or mason, and a painter, for the restoration. In practice, the scheduling difficulties for the several craftsmen may require several days to the complete task.

The more time and effort required, the higher the cost of window replacement. When several windows are to be replaced, the client must balance costs against budget, frequently choosing to replace less than the total number of windows desired in order to remain within budgetary constraints.

The prior art does not suggest any alternative tools or methods for minimizing the destruction of the surrounding surfaces, expediting the procedure or minimizing costs when remodeling involves the removal and replacement of metal framed windows and doors. One patent related to the roof construction art, embodies in a limited manner in a different context some of the concepts of the present invention.

U.S. Pat. No. 4,742,992 (Allen) discloses the use of a clamping plier and attached leveraging device to apply tension to membrane-like, sheet materials spread over roofs in the construction of the final weather resistant covering. The device disclosed by Allan operates over a short, fixed range of travel desired for removing wrinkles from the membrane. In use, the device is positioned sequentially along an edge of the membrane and tension applied at each point to stretch the material. The use of a clamping plier facilitates the repetitive attachment of the device to the material. Allan does not suggest that the apparatus can be used on removal operations, that it may be adapted to operate over a large range of distances by the use of a cable or chain operating around a capstan or sprocket, nor that the range of movement may be extended beyond that achieved by a single stroke of the lever handle.

Windows may be large such as picture windows or small such as bathroom windows. Doors, such as patio doors, may be single or double width, and may be as wide as 16 feet. It should be not that windows may be located on second and higher floors of a multi-story building. Thus, in the practice of removing and replacing windows and doors of differing sizes and shapes, tools must adapt to varying dimensions and window and door locations in order to accommodate the needs of the craftsman.

DISCLOSURE OF INVENTION

The present invention provides an efficient system for the removal of metal framed windows and metal framed patio doors which eliminates the collateral damage to the exterior and interior surfaces of the building adjacent to the window or door. The system efficiently and quickly completes the removal, leaving the basic supporting frame structure undamaged and ready to receive the replacement component. The replacement component may then be installed and the task is complete. The entire process is typically completed in a matter of minutes or hours. The speed with which the removal and replacement is achieved provides corresponding reduced cost to complete the remodeling process.

The system consists of a tool and a procedure for its use which combine into a simple yet efficient process. The tool consists of two clamping devices to attach the tool to the frame to be removed, two safety clamps to prevent injury to the user, if a main clamping device unexpectedly disengages from the frame, and a tensioning device to apply sufficient force to the frame to simultaneously pull it loose from the supporting structure and pull it out from under metal-to-wood joint finish materials.

The clamping devices may be made from any of several devices such as cam-locking pliers, commonly known as "Vise-grips", or C-clamps which may be securely affixed to the frame and easily removed after use. The tensioning device may consist of a ratcheting cable puller, commonly known as a "come-along", or a screw-like device such as a turnbuckle. The two devices are adjustably connected together with a strong coupler such as steel cable or chain.

In use, one clamping device is attached to one frame member and the other device affixed to the opposite member. The tensioning device is then connected between the two clamping devices with the coupler and the connection tightened with sufficient force to inwardly pull the frame member loose from the supporting structure. Repositioning the tool around the frame allows the frame to be progressively pulled from the supporting structure.

In practice, as the removal procedure nears completion, often the final frame piece must be removed without any opposing frame member to which the second clamp may be attached. Therefore, an anchor, consisting of a screw eye, is secured to the frame supporting structure opposite the remaining frame piece for coupling to one end of the tensioning device. Tightening the tensioning device then completes the removal of the frame. The screw eye is removed from the supporting structure and the removal process is complete.

The system operates by pulling inwardly on the metal frame of the window or door. This action shears the fasteners which hold the window or door in place without disturbing the covering finish materials around the window or door. Pulling inwardly, parallel to the exterior surface around the window or door, allows the component to be removed without disturbing the surrounding surfaces, either interior or exterior. The replacement component may then be installed and any desired trim affixed to complete the restoration.

It should be noted that the entire process of removing the window frame can be performed from inside the building. Thus, no scaffolding or other means of providing access to the outside of a window frame located on the second or higher floor of a multi-story building is required to use the system of the present invention.

BRIEF DESCRIPTION OF DRAWINGS

For fuller understanding of the present invention, reference is made to the accompanying drawing in the following detailed description of the Best Mode for Carrying Out the Invention. In the drawing.

Figure 1:
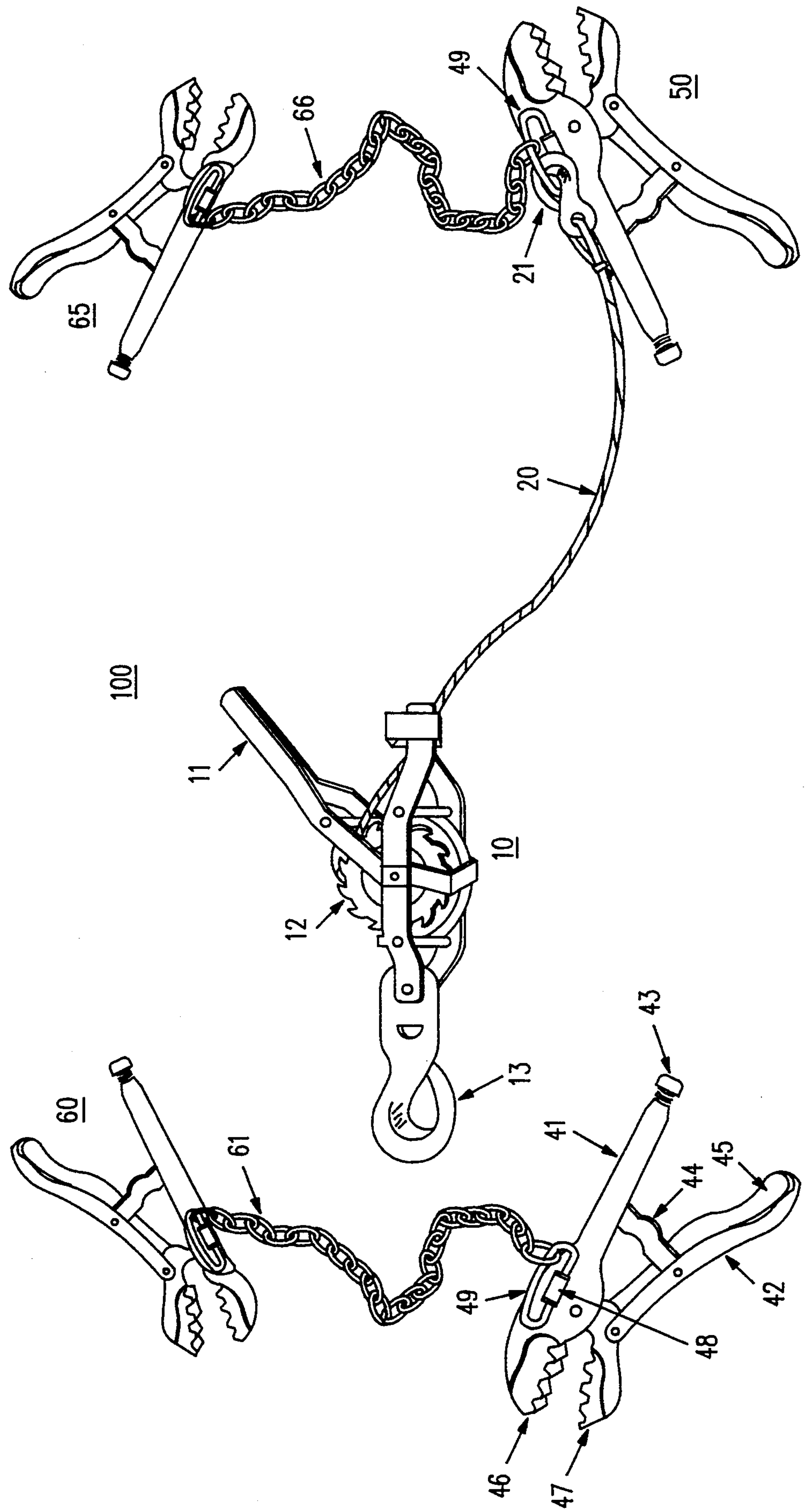
FIG. 1 is a perspective view of the apparatus of the present invention.

Reference numbers refer to the same or equivalent parts of the present invention throughout the several figures of the drawing.

BEST MODE OF CARRYING OUT THE INVENTION

Referring now to FIG. 1, the apparatus comprising the system of the present invention is shown. Tool 100 consists of tensioning device 10, hereinafter called come-along 10, and clamping devices 40 and 50, hereinafter called clamps 40 and 50. Connecting cable 20 connects come-along 10 to clamp 50 with hook 21. Hook 13 of come-along 10 connects to clamp 40 at ring loop 49 to complete the assembly. Safety clamps 60 and 65 and the use of tool 100 are described hereinbelow. Hook 13 is preferably a closeable hooking device such as a quick-disconnect self-locking loop, also referred to as a snap hook.

Figure 2:
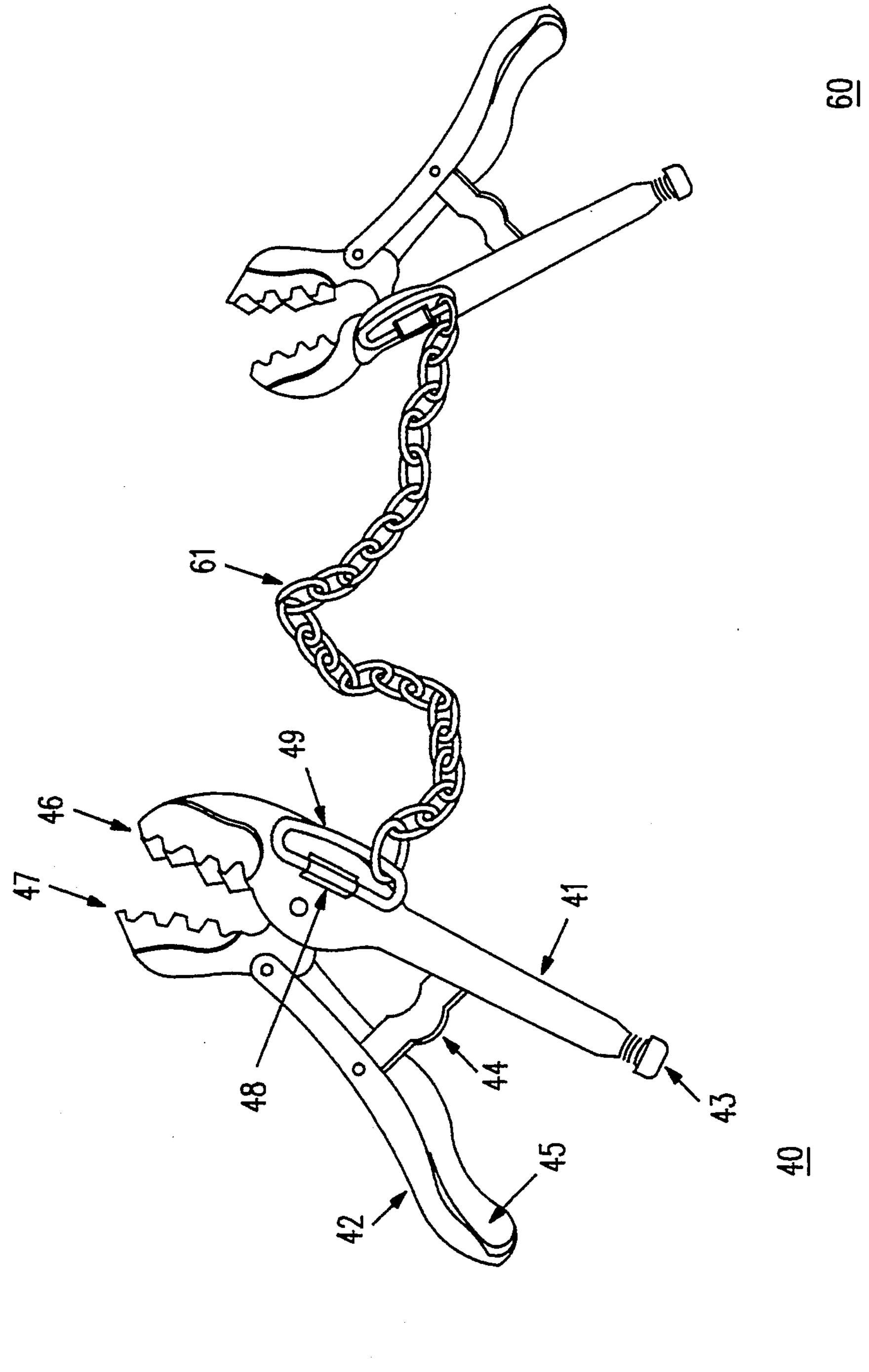
FIG. 2 is a detail of the fastening component of the apparatus of FIG. 1.

Referring now to FIG. 2, clamps 40 and 60 are shown. The following description, while in the singular, is understood to apply equally to clamps 50, 60 and 65. Clamps 40 and 50 are preferably formed from a Vice Grip adjustable cam-locking plier, model 10WR or equivalent. Use of cam-locking pliers of sufficient gripping strength provides a quickly adjustable clamp which will accommodate a wide range of material thickness in the frame to be removed.

Clamp 40 consists of a cam-locking plier as is well known in the art to which a moveable fastening aperture or ring loop 49 is securely attached. The plier component consists of handles 41 and 42 which close jaws 46 and 47 when handles 41 and 42 are closed together. Adjusting screw 43 moves one end of cam 44 longitudinally within handle 41 so as to set the separation between jaws 46 and 47 when handles 41 and 42 are closed. Releasing lever 45 unlocks the handles so that the jaws release any object gripped by the jaws.

Ring-loop 49 consists of a steel oval ring, typically constructed of one fourth to one half inch diameter material, moveably mounted in terminus 48 which closes the ends of loop 49. Terminus 48 is welded to clamp 40, thereby securing loop 49 to clamp 40. Terminus 48 preferably allows loop 49 to be rotated to any angle relative to the surface of clamp 40 so that hook 13 may be received by loop 49 and the geometry of the assembled tool adjusted to align the pulling stresses. If loop 49 is of sufficient strength to withstand any stress applied when tool 100 is used, loop 49 may be fixedly attached, as by welding, to clamp 40. Tensioning device 10 is quickly attached to or detached from clamps 40 and 50 by inserting hook 13 and/or hook 21, respectively, into ring loops 49, respectively.

Figure 3:
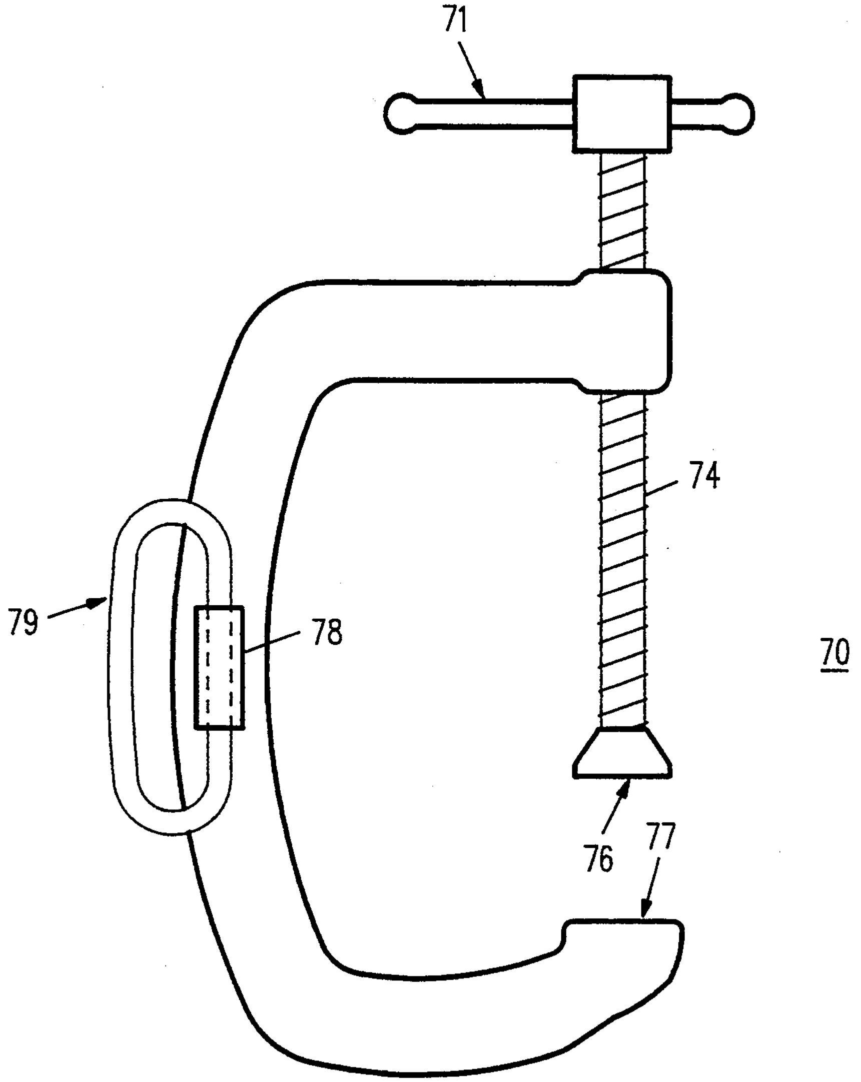
FIG. 3 is a detail of a secondary fastening component for use with the apparatus of FIG. 1.

Frames wider than the gripping range of cam-locking pliers will require that the clamp have a greater capacity, such as provided by a C-clamp, common to the building and machining arts, as shown in FIG. 3 and described hereinbelow. Alternating between clamping devises having a variety of clamping range, such as pliers and C-clamps, is easily done because of the ease with which the clamp may be disconnected from the attached tensioning device as described hereinbelow. Safety clamps 60 and 65 consist of a cam-locking plier such as a Vice Grip model 5WR modified similarly to clamp 40. Modified clamp 60 need not be as robust as clamp 40 as it serves as a safety restraining device for user safety. Clamp 60 is attached to clamp 40 by chain 61. In use, clamp 60 is affixed to the frame to be removed near the point where clamp 40 is attached. In the event clamp 40 is dislodged while tool 100 is in use, clamp 60 and chain 61 restrain clamp 40 and prevent injury to the user or damage to the surfaces surrounding the window frame being removed.

Clamp 50 is also equipped with a loop 49 in the same manner as clamp 40 is so equipped. Safety clamp 65 is equipped similarly to clamp 60 and serves the same function in the same manner as does clamp 60. Tool 100 may be operated without safety clamps 60 and 65 but this is not recommended.

Come-along 10 consists of handle 11, pawl and ratchet spool assembly 12 assembled together in a manner well known in the art. Spool 12 serves as a capstan around which cable 20 is wound when come-along 10 handle 11 is moved in a back and forth motion. Spool 12 typically receives a steel cable 20 which is secured to come-along 10 at one end and terminates at snap hook 21 at the other end. Come-along 10 and cable 20 should be rated at least at 4,000 pounds capacity.

In use, moving handle 11 of come-along 10 winds cable 20 around spool 12 with a tensile force equal to the rated capacity of the device and the clamps are drawn together. When clamps 40 or 50 need to be moved or replaced, the applied tension is released and come-along 10 may be quickly disconnected from loops 49 of clamps 40 and 50, respectively.

Come-along 10 may be of any design which moves opposite ends of a connecting medium together so as to exert great force. For example, if connecting medium is a chain, spool 12 may be a capstan or toothed sprocket. Alternatively, come-along 10 may be a turnbuckle or other screw device which draws opposing ends together. The commonly available cable equipped come-along is preferred in the present application however, because of its ease of operation, low cost, ready availability, and the broad reach of its cable.

Referring now to FIG. 3, an alternative clamp 70 is shown. If the metal frame to be removed is of greater thickness than may be gripped by pliers, as in a door frame, a modified C-clamp is used. Clamp 70 is a conventional C-clamp to which has been added an aperture loop 79. Loop 79 is a steel loop as described hereinabove in reference to loop 49. Loop 79 is moveably attached to terminus 78 as described hereinabove in reference to terminus 48. Terminus 78 is welded to C-clamp 70.

Clamp 70 is secured by turning handle 71 which moves jaws 76 and 77 by rotating screw 74 in a manner well known in the art. When used with tool 100 clamp 70 may be used in lieu of and in the same manner as clamps 40 or 50. The use of a safety clamp 60 in the same manner as described hereinabove is recommended.

Figure 4:
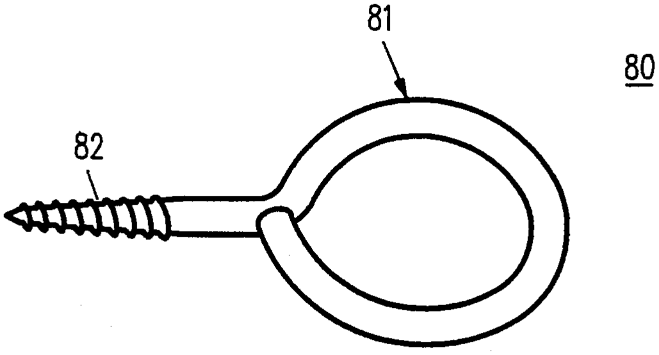
FIG. 4 is a detail of an anchoring component for use with the apparatus of FIG. 1.

Referring now to FIG. 4, anchor 80 is shown. Anchor 80 typically consists of screw-eye 81, but may comprise any convenient anchoring device to which one end of come-along 10 can be coupled.

Figure 5:
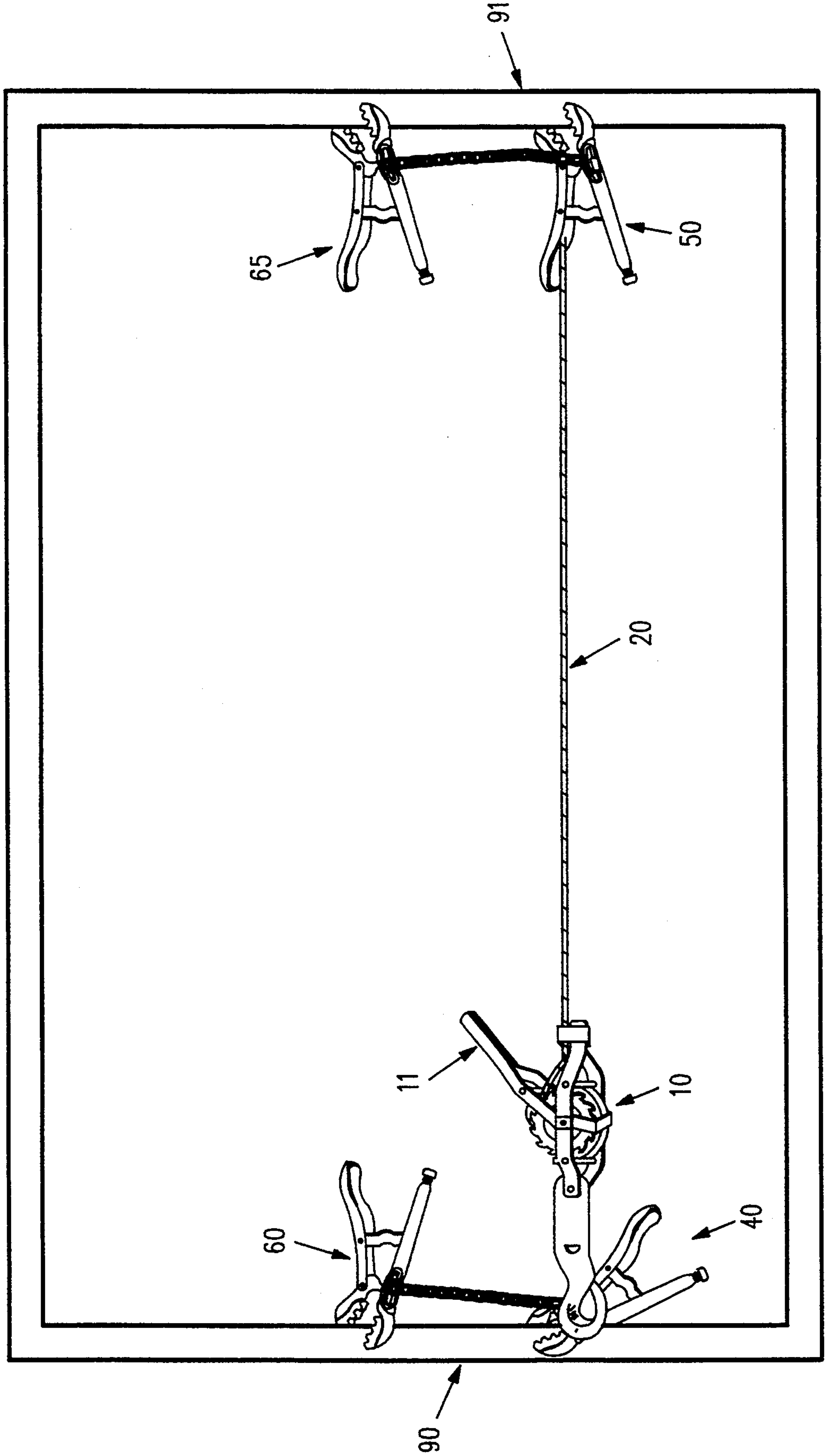
FIG. 5 is a schematic representation of the apparatus of FIG. 1 in use for removing a metal window frame.

Referring now to FIGS. 1, 2 and 5, the operation of tool 100 is shown. The glass is first removed from the window and any interior subframing within the window is removed so as to leave only the exterior window frame still attached to the supporting structure of the building. If a door frame is to be removed, the door, any fixed windows or panels and threshold are first removed from the frame.

Clamp 40 is then affixed to one frame member 90 and clamp 50 is affixed to the opposite frame member 91, both clamps being initially attached proximal the center of frame members 90 and 91. If a door frame is to be removed, the clamps are attached near the threshold end of the door frame sides.

Come-along 10 is then connected between the two clamps with cable 20 as shown. Repeatedly moving handle 11 in a back and forth motion winds cable 20 around spool 12 and tightens the connection with sufficient force to shear off the fastening nails or screws and inwardly pull frame member 90 or 91 loose from the supporting structure.

Repositioning the clamps of the tool around the frame allows the frame to be progressively pulled inwardly from the supporting structure. When the final frame member is to be removed, anchor 80 is utilized in place of one clamp. When the frame being removed is reduced to the last few pieces, there may not be a suitable place to affix the second clamp, 40 or 70. At this point the user installs anchor 80 screw-eye 81 into the supporting structure of the window opening by turning screw 82 into the structure in a manner well known in the art, then attaches loop 83 thereto. Removal of the remaining pieces of the frame continues as described herein. When the final pieces of the frame are removed, anchor 80 is removed from the supporting structure and the removal procedure is complete.

The craftsman may then install a replacement component in the opening from which the previous component was removed. The procedure and tool described hereinabove operate so as to remove the old component without damaging the surrounding surfaces. Usually no restoration work beyond normal sealing and caulking is required.

The present invention has been particularly shown and described with respect to certain preferred embodiments thereof. However, it should be readily apparent to those of ordinary skill in the art that various changes and modifications in form and details may be made without departing from the spirit and scope of the invention as set forth in the appended claims.

I claim:

1. A metal sash frame puller comprising:

first, second, third and fourth cam-locking pliers, each including a first handle having a fixed serrate jaw at one end and having a terminus thereon substantially near to said fixed serrate jaw, an opposing serrate jaw pivotally mounted on said first handle, a second handle pivotally mounted on said opposing jaw, a cam pivotally mounted between said first handle and said second handle for moving said serrate jaws into clamping engagement and locking said serrate jaws in said clamping engagement, an adjusting screw engaged in another end of said first handle for adjusting the distance between said first and said second serrate jaws in said clamping engagement, a releasing lever for unlocking said first and said second handles from said clamping engagement, and a ring-loop rotatably secured within said terminus;

a come-along for pulling said first and second cam-locking pliers substantially towards one another, said come-along having a frame, an axle mounted on said frame, a ratchet spool assembly rotatably mounted on said axle, an actuating arm pivotally mounted on said frame, said actuating arm having a first pawl for engaging and imparting rotary motion to said ratchet spool assembly when said actuating arm is manually oscillated, a second pawl for preventing counter-rotary motion of said ratchet spool assembly, a first hook mounted substantially at one end of said frame, a cable assembly including a steel cable having a second hook affixed at one end thereof, said cable attached by a second end to said ratchet spool assembly, said frame having a fairlead mounted substantially at another end of said frame, said fairlead forming an aperture for guiding said cable therethrough as said cable is wound around said ratchet spool assembly in response to said actuating arm being manually oscillated;

first connecting means for connecting said ring-loop of said first cam-locking plier with said ring-loop of said third cam-locking plier;

second connecting means for connecting said ring-loop of said second cam-locking plier with said ring-loop of said fourth cam-locking plier; and said first hook of said come-along engageable with said ring-loop of said first cam-locking plier and said second hook of said come-along engageable with said ring-loop of said second cam-locking plier.

2. A metal sash frame puller comprising:

first, second, third and fourth C-clamps, each including a substantially C-shaped frame having a stationary jaw at the end of one arm of said C-shaped frame and a transverse threaded hole at the end of the other arm of said C-shaped frame, a ring-loop secured to said C-shaped frame substantially near to said stationary jaw, a threaded rod engaged in said threaded hole for applying screw pressure to said stationary jaw, and handle means for turning said threaded rod;

a come-along for pulling said first and second C-clamps substantially towards one another, said come-along having a frame, an axle mounted on said frame, a ratchet spool assembly rotatably mounted on said axle, an actuating arm pivotally mounted on said frame, said actuating arm having a first pawl for engaging and imparting rotary motion to said ratchet spool assembly when said actuating arm is manually oscillated, a second pawl for preventing counter-rotary motion of said ratchet spool assembly, a first hook mounted substantially at one end of said frame, a cable assembly including a steel cable having a second hook affixed at one end thereof, said cable attached by a second end to said ratchet spool assembly, said frame having a fairlead mounted substantially at another end of said frame, said fairlead forming an aperture for guiding said cable therethrough as said cable is wound around said ratchet spool assembly in response to said actuating arm being manually oscillated;

first connecting means for connecting said ring-loop of said first C-clamp with said ring-loop of said third C-clamp;

second connecting means for connecting said ring-loop of said second C-clamp with said ring-loop of said fourth C-clamp; and said first hook of said come-along engageable with said ring-loop of said first C-clamp and said second hook of said come-along engageable with said ring-loop of said second C-clamp.

* * * * *